(12) United States Patent
Borden

(10) Patent No.: US 10,290,904 B2
(45) Date of Patent: May 14, 2019

(54) WAFER-BASED BIPOLAR BATTERY PLATE

(71) Applicant: Gridtential Energy, Inc., Santa Clara, CA (US)

(72) Inventor: Peter Gustave Borden, San Mateo, CA (US)

(73) Assignee: Gridtential Energy, Inc., Santa Clara, CA (US)

( * ) Notice: Subject to any disclaimer, the term of this patent is extended or adjusted under 35 U.S.C. 154(b) by 143 days.

(21) Appl. No.: 15/413,692

(22) Filed: Jan. 24, 2017

(65) Prior Publication Data

US 2017/0200980 A1    Jul. 13, 2017

Related U.S. Application Data

(63) Continuation of application No. 14/477,312, filed on Sep. 4, 2014, now Pat. No. 9,570,737, which is a (Continued)

(51) Int. Cl.
*H01M 4/134* (2010.01)
*H01M 10/18* (2006.01)
(Continued)

(52) U.S. Cl.
CPC ............. *H01M 10/18* (2013.01); *H01M 2/14* (2013.01); *H01M 4/0404* (2013.01);
(Continued)

(58) Field of Classification Search
CPC ...... H01M 10/18; H01M 4/366; H01M 10/12; H01M 4/14; H01M 4/0492; H01M 4/38;
(Continued)

(56) References Cited

U.S. PATENT DOCUMENTS

| | | | |
|---|---|---|---|
| 3,982,960 A * | 9/1976 | Hoekje | H01M 4/00 429/199 |
| 4,324,848 A | 4/1982 | Will | |

(Continued)

FOREIGN PATENT DOCUMENTS

| | | |
|---|---|---|
| CA | 2825921 A1 | 5/2017 |
| CN | 1523690 A | 8/2004 |

(Continued)

OTHER PUBLICATIONS

Machine translation of JP 2007-335206, retrieved from <https://www.j-platpat.inpit.go.jp/web/all/top/BTmTopEnglishPage> on Aug. 8, 2018.*

(Continued)

*Primary Examiner* — Cynthia K Walls
(74) *Attorney, Agent, or Firm* — Schwegman Lundberg & Woessner, P.A.

(57) ABSTRACT

An example includes a method including forming a battery electrode by disposing an active material coating onto a silicon substrate, assembling the battery electrode into a stack of battery electrodes, the battery electrode separated from other battery electrodes by a separator, disposing the stack in a housing, filling the interior space with electrolyte, and sealing the housing to resist the flow of electrolyte from the interior space.

19 Claims, 14 Drawing Sheets

Related U.S. Application Data continuation of application No. 13/994,434, filed as application No. PCT/US2012/037598 on May 11, 2012, now Pat. No. 8,828,582.

(60) Provisional application No. 61/484,854, filed on May 11, 2011, provisional application No. 61/525,068, filed on Aug. 18, 2011.

(51) Int. Cl.
| | |
|---|---|
| H01M 2/14 | (2006.01) |
| H01M 4/04 | (2006.01) |
| H01M 4/22 | (2006.01) |
| H01M 4/38 | (2006.01) |
| H01M 4/56 | (2006.01) |
| H01M 4/66 | (2006.01) |
| H01M 4/68 | (2006.01) |
| H01M 4/82 | (2006.01) |
| H01M 10/04 | (2006.01) |
| H01M 10/14 | (2006.01) |
| H01M 4/14 | (2006.01) |
| H01M 10/12 | (2006.01) |
| H01M 4/36 | (2006.01) |
| H01M 4/02 | (2006.01) |

(52) U.S. Cl.
CPC ......... *H01M 4/045* (2013.01); *H01M 4/0426* (2013.01); *H01M 4/0457* (2013.01); *H01M 4/0492* (2013.01); *H01M 4/14* (2013.01); *H01M 4/22* (2013.01); *H01M 4/366* (2013.01); *H01M 4/38* (2013.01); *H01M 4/56* (2013.01); *H01M 4/667* (2013.01); *H01M 4/68* (2013.01); *H01M 4/82* (2013.01); *H01M 10/0418* (2013.01); *H01M 10/12* (2013.01); *H01M 10/14* (2013.01); *H01M 2004/021* (2013.01); *H01M 2004/029* (2013.01); *Y02E 60/126* (2013.01); *Y02T 10/7016* (2013.01); *Y10T 29/4911* (2015.01)

(58) Field of Classification Search
CPC ...... H01M 10/0418; H01M 4/82; H01M 4/68; H01M 4/667; H01M 4/56; H01M 2/14; H01M 4/22; H01M 10/14; H01M 4/0457; H01M 4/045; H01M 4/0426; H01M 4/0404; H01M 2004/029; H01M 2004/021; Y10T 29/4911; Y02T 10/7016; Y02E 60/126
See application file for complete search history.

(56) References Cited

U.S. PATENT DOCUMENTS

| | | | |
|---|---|---|---|
| 4,828,939 | A | 5/1989 | Turley et al. |
| 5,156,932 | A | 10/1992 | Dougherty et al. |
| 5,279,909 | A | 1/1994 | Horner et al. |
| 5,298,683 | A | 3/1994 | Taylor |
| 5,302,472 | A | 4/1994 | Ando et al. |
| 5,470,679 | A | 11/1995 | Lund et al. |
| 5,595,839 | A * | 1/1997 | Hossain ............... H01M 10/05 429/210 |
| 5,837,601 | A | 11/1998 | Matsumoto |
| 5,916,709 | A | 6/1999 | Arias et al. |
| 5,948,562 | A | 9/1999 | Fulcher et al. |
| 6,210,826 | B1 | 4/2001 | Dopp et al. |
| 6,500,585 | B1 | 12/2002 | Saakes et al. |
| 7,473,488 | B2 | 1/2009 | Knight et al. |
| 7,479,466 | B2 | 1/2009 | Lu et al. |
| 8,633,373 | B2 | 1/2014 | Greiff et al. |
| 8,828,582 | B2 | 9/2014 | Borden |
| 9,570,737 | B2 | 2/2017 | Borden |
| 10,008,713 | B2 | 6/2018 | Mui et al. |
| 10,090,515 | B2 | 10/2018 | Mui et al. |
| 2007/0111090 | A1 | 5/2007 | Cardenas-valencia et al. |
| 2007/0139001 | A1 | 6/2007 | Hahn |
| 2007/0269718 | A1 | 11/2007 | Krause et al. |
| 2008/0090129 | A1 | 4/2008 | Kunz et al. |
| 2008/0292953 | A1 | 11/2008 | Hosaka et al. |
| 2009/0061319 | A1 | 3/2009 | Kim et al. |
| 2010/0062335 | A1 | 3/2010 | Datta |
| 2010/0255371 | A1 | 10/2010 | Takayama et al. |
| 2010/0310923 | A1 | 12/2010 | Ogg et al. |
| 2010/0330411 | A1 | 12/2010 | Nam et al. |
| 2011/0014520 | A1 | 1/2011 | Ueda |
| 2011/0141618 | A1 | 6/2011 | Wallash et al. |
| 2011/0223467 | A1 | 9/2011 | Shacklette et al. |
| 2013/0026409 | A1 | 1/2013 | Baker et al. |
| 2013/0065105 | A1 | 3/2013 | Faust |
| 2013/0130096 | A1 | 5/2013 | Lev et al. |
| 2014/0079985 | A1 | 3/2014 | Borden |
| 2014/0370369 | A1 | 12/2014 | Borden |
| 2016/0308195 | A1 | 10/2016 | Mui et al. |
| 2016/0329535 | A1 | 11/2016 | Moomaw et al. |
| 2016/0359164 | A1 | 12/2016 | Mui et al. |

FOREIGN PATENT DOCUMENTS

| | | | |
|---|---|---|---|
| CN | 101558512 | A | 10/2009 |
| CN | 103493250 | A | 1/2014 |
| CN | 103493250 | B | 8/2016 |
| CN | 105958003 | A | 9/2016 |
| GB | 1394694 | A | 5/1975 |
| IN | 201617025763 | A | 8/2016 |
| JP | 60101867 | A | 6/1985 |
| JP | 61283173 | A | 12/1986 |
| JP | 5135761 | A | 6/1993 |
| JP | 5135761 | A | 6/1993 |
| JP | 05135761 | A | 6/1993 |
| JP | H05135761 | A | 6/1993 |
| JP | 07142054 | A | 6/1995 |
| JP | 08241707 | A | 9/1996 |
| JP | 2006040722 | A | 2/2006 |
| JP | 2007335198 | A | 12/2007 |
| JP | 2007335206 | A | 12/2007 |
| JP | 2014507774 | A | 3/2014 |
| JP | 5634623 | B2 | 10/2014 |
| JP | 2015028954 | A | 2/2015 |
| JP | 6058609 | B2 | 12/2016 |
| KR | 1020090093191 | A | 9/2009 |
| KR | 1020130114736 | A | 10/2013 |
| KR | 101590529 | B1 | 2/2016 |
| KR | 1020160017108 | A | 2/2016 |
| KR | 1020160121517 | A | 10/2016 |
| KR | 10-1702414 | | 1/2017 |
| WO | WO-2008059529 | A1 | 5/2008 |
| WO | WO-2011109477 | A2 | 9/2011 |
| WO | WO-2012155082 | A1 | 11/2012 |
| WO | WO-2015103304 | A1 | 7/2015 |
| WO | WO-2015127081 | A1 | 8/2015 |

OTHER PUBLICATIONS

"U.S. Appl. No. 15/197,346, Notice of Allowance dated Jul. 13, 2018", 7 pgs.

"Chinese Application Serial No. 201610407652.6, Response filed May 7, 2018 to Office Action dated Dec. 21, 2017", w/ English Claims, 9 pgs.

"Indian Application Serial No. 6863/DELNP/2013, First Examiner Report dated May 11, 2018", 6 pgs.

"U.S. Appl. No. 13/994,434, Examiner Interview Summary dated Apr. 2, 2014", 3 pgs.

"U.S. Appl. No. 13/994,434, Final Office Action dated Apr. 15, 2014", 9 pgs.

"U.S. Appl. No. 13/994,434, Non Final Office Action dated Dec. 31, 2013", 12 pgs.

"U.S. Appl. No. 13/994,434, Notice of Allowance dated Jun. 24, 2014", 7 pgs.

"U.S. Appl. No. 13/994,434, Preliminary Amendment filed Jun. 14, 2013", 7 pgs.

(56) References Cited

OTHER PUBLICATIONS

"U.S. Appl. No. 13/994,434, Response filed Mar. 27, 2014 to Non Final Office Action dated Dec. 31, 2013", 12 pgs.
"U.S. Appl. No. 13/994,434, Response filed May 16, 2014 to Final Office Action dated Apr. 15, 2014", 10 pgs.
"U.S. Appl. No. 14/477,312, Notice of Allowance dated Oct. 28, 2016", 9 pgs.
"U.S. Appl. No. 14/477,312, Preliminary Amendment filed Sep. 22, 2014", 7 pgs.
"U.S. Appl. No. 14/477,312, Preliminary Amendment filed Oct. 18, 2016", 3 pgs.
"U.S. Appl. No. 14/667,240, Notice of Allowance dated Apr. 21, 2016", 9 pgs.
"U.S. Appl. No. 15/109,402, Preliminary Amendment filed Jun. 30, 2016", 9 pgs.
"Canadian Application Serial No. 2,825,921, Office Action dated Jan. 20, 2015", 8 pgs.
"Canadian Application Serial No. 2,825,921, Office Action dated Oct. 20, 2015", 3 pgs.
"Canadian Application Serial No. 2,825,921, Office Action dated Nov. 2, 2016", 4 pgs.
"Canadian Application Serial No. 2,825,921, Response filed Nov. 9, 2015 to Office Action dated Oct. 20, 2015", 15 pgs.
"Canadian Application Serial No. 2,825,921, Response filed Nov. 17, 2016 to Office Action dated Nov. 2, 2016", 19 pgs.
"Canadian Application Serial No. 2,825,921,Response filed Jul. 7, 2015 to Office Action dated Jan. 20, 2015", 19 pgs.
"Chinese Application Serial No. 201280009851.1, Office Action dated Apr. 22, 2015", w/ English Translation, 12 pgs.
"Chinese Application Serial No. 201280009851.1, Office Action dated Aug. 31, 2015", w/ English Translation, 2 pgs.
"Chinese Application Serial No. 201280009851.1, Response filed Jan. 15, 2016 to Office Action dated Aug. 31, 2015", with English translation of claims, 10 pgs.
"Chinese Application Serial No. 201280009851.1, Response filed Jul. 15, 2015 to Office Action dated Apr. 22, 2015", w/ English Claims, 41 pgs.
"Chinese Application Serial No. 201280009851.1, Voluntary Amendment filed May 9, 2014", w/English specification and claims, 29 pgs.
"European Application Serial No. 12722634.8, Examination Notification Art, 94(3) dated Dec. 11, 2014", 5 pgs.
"European Application Serial No. 12722634.8, Office Action dated Mar. 27, 2014", 6 pgs.
"European Application Serial No. 12722634.8, Response filed Aug. 1, 2014 to Office Action dated Mar. 27, 2014", 13 pgs.
"European Application Serial No. 12722634.8, Response filed Apr. 13, 2015 to Examination Notification Art, 94(3) dated Dec. 11, 2014", 15 pgs.
"European Application Serial No. 15198173.5, Extended European Search Report dated Mar. 30, 2016", 9 pgs.
"European Application Serial No. 15198173.5, Response filed Dec. 12, 2016 to Extended European Search Report dated Mar. 30, 2016", 17 pgs.
"International Application Serial No. PCT/US2012/037598, International Preliminary Report on Patentability dated Jul. 23, 2013", 12 pgs.
"International Application Serial No. PCT/US2012/037598, International Search Report dated Jul. 23, 2012", 3 pgs.
"International Application Serial No. PCT/US2012/037598, Written Opinion dated Jul. 23, 2012", 17 pgs.
"International Application Serial No. PCT/US2012/037598, Written Opinion dated Jul. 23, 2012", 8 pgs.
"International Application Serial No. PCT/US2012/037598, Written Opinion of the International Preliminary Examining Authority, dated Apr. 18, 2013", 6 pgs.
"International Application Serial No. PCT/US2014/072804, International Preliminary Report on Patentability dated Jul. 14, 2016", 11 pgs.
"International Application Serial No. PCT/US2014/072804, International Search Report dated Apr. 23, 2015", 3 pgs.
"International Application Serial No. PCT/US2014/072804, Written Opinion dated Apr. 23, 2015", 9 pgs.
"International Application Serial No. PCT/US2014/072824, International Preliminary Report on Patentability dated Jul. 14, 2016", 9 pgs.
"International Application Serial No. PCT/US2014/072824, International Search Report dated Mar. 24, 2015", 2 pgs.
"International Application Serial No. PCT/US2014/072824, Written Opinion dated Mar. 24, 2015", 7 pgs.
"International Application Serial No. PCT/US2015/016622, International Preliminary Report on Patentability dated Sep. 1, 2016", 9 pgs.
"International Application Serial No. PCT/US2015/016622, International Search Report dated May 20, 2015", 2 pgs.
"International Application Serial No. PCT/US2015/016622, Written Opinion dated May 20, 2015", 7 pgs.
"Japanese Application Serial No. 2013-552743, Office Action dated Jan. 21, 2014", w/ English Translation, 4 pgs.
"Japanese Application Serial No. 2013-552743, Office Action dated May 20, 2014", w/English translation, 4 pgs.
"Japanese Application Serial No. 2013-552743, Response filed Apr. 21, 2014 to Office Action dated Jan. 21, 2014", w/English claims, 13 pgs.
"Japanese Application Serial No. 2013-552743, Response filed Aug. 18, 2014 to Office Action dated May 20, 2014", w/English claims, 9 pgs.
"Japanese Application Serial No. 2014-209992, Office Action dated Apr. 26, 2016", with English translation of claims, 5 pgs.
"Japanese Application Serial No. 2014-209992, Office Action dated Dec. 15, 2015", with English translation, 8 pgs.
"Japanese Application Serial No. 2014-209992, Response filed Mar. 28, 2016 to Office Action dated Dec. 15, 2015", with English translation of claims, 6 pgs.
"Japanese Application Serial No. 2014-209992, Response filed Oct. 19, 2016 to Office Action dated Apr. 26, 2016", 7 pgs.
"Korean Application Serial No. 10-2013-7021903, Office Action dated Feb. 9, 2015", w/ English Claims, 15 pgs.
"Korean Application Serial No. 10-2013-7021903, Response filed Aug. 7, 2015 to Office Action dated Feb. 9, 2015", w/ English Claims, 27 pgs.
"Korean Application Serial No. 10-2016-7002096, Office Action dated Apr. 14, 2016", with English translation of claims, 10 pgs.
"Korean Application Serial No. 10-2016-7002096, Response filed Jun. 14, 2016 to Office Action dated Apr. 14, 2016", (English Translation of Claims), 16 pgs.
Ottaviani, G, et al., "Reliability and degradation: Mechanisms and interfacial layers in silicide formation", John Wiley & Sons Ltd, (1981), 105-149.
"U.S. Appl. No. 15/197,346, Non Final Office Action dated Jan. 16, 2018", 6 pgs.
"U.S. Appl. No. 15/197,346, Response filed Apr. 16, 2018 to Non Final Office Action dated Jan. 16, 2018", 7 pgs.
"U.S. Appl. No. 15/197,346, Response filed Oct. 27, 2017 to Restriction Requirement dated Aug. 28, 2017", 7 pgs.
"U.S. Appl. No. 15/197,346, Restriction Requirement dated Aug. 28, 2017", 8 pgs.
"U.S. Appl. No. 15/242,206, Notice of Allowance dated Feb. 28, 2018", 8 pgs.
"Canadian Application Serial No. 2,948,737, Office Action dated Dec. 27, 2017", 5 pgs.
"Chinese Application Serial No. 201610407652.6, Office Action dated Dec. 21, 2017", with English translation of claims, 12 pgs.
"European Application Serial No. 12722634.8, Office Action dated Jun. 8, 2015", 6 pgs.
Zuo, Wenhua, et al., "Battery-Supercapacitor Hybrid Devices: Recent Progress and Future Projects", Adv. Sci. 4, 1600539, [Online]. Retrieved from the Internet: <URL: https://www.ncbi.nlm.nih.gov/pmc/articles/PMC5514976/pdf/ADVS-4-na.pdf>, (2017), 1-21.

(56) References Cited

OTHER PUBLICATIONS

"Canadian Application Serial No. 2,948,737, Response filed Jun. 25, 2018 to Office Action dated Dec. 27, 2017", w/ English Claims, 20 pgs.

* cited by examiner

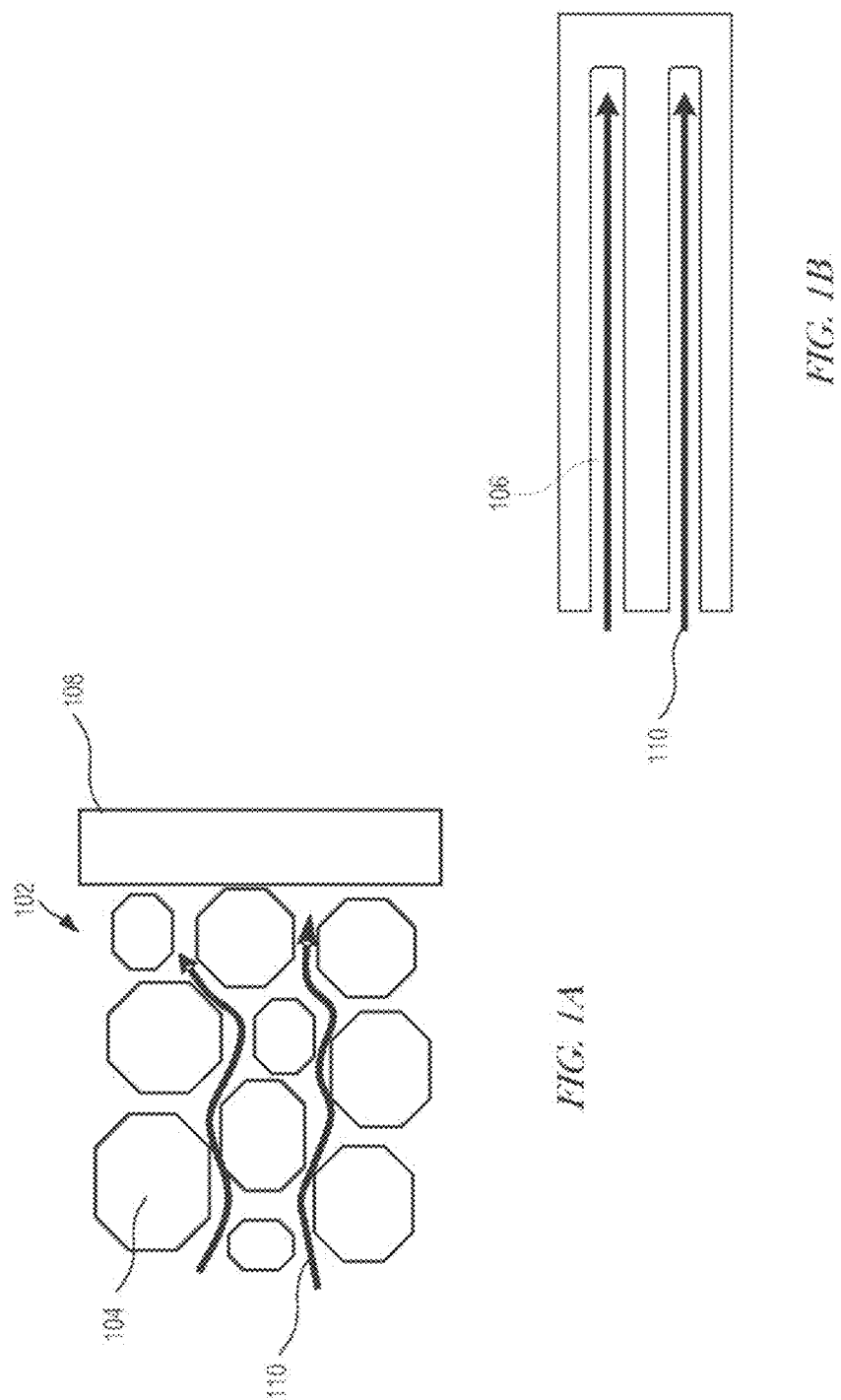

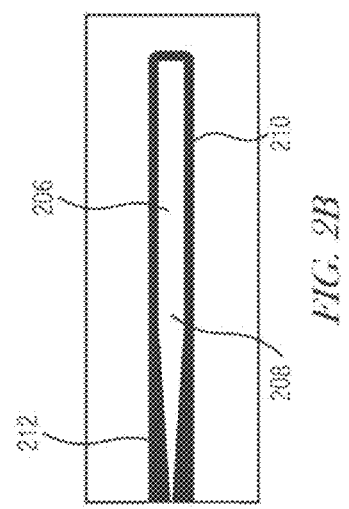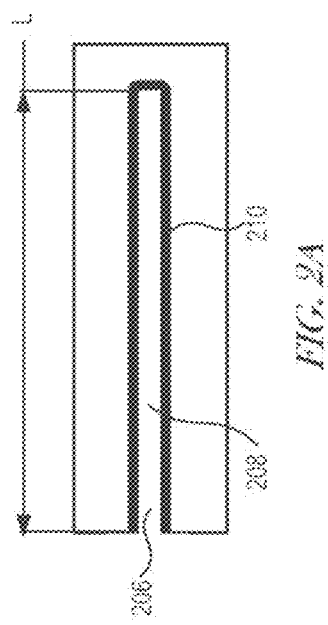

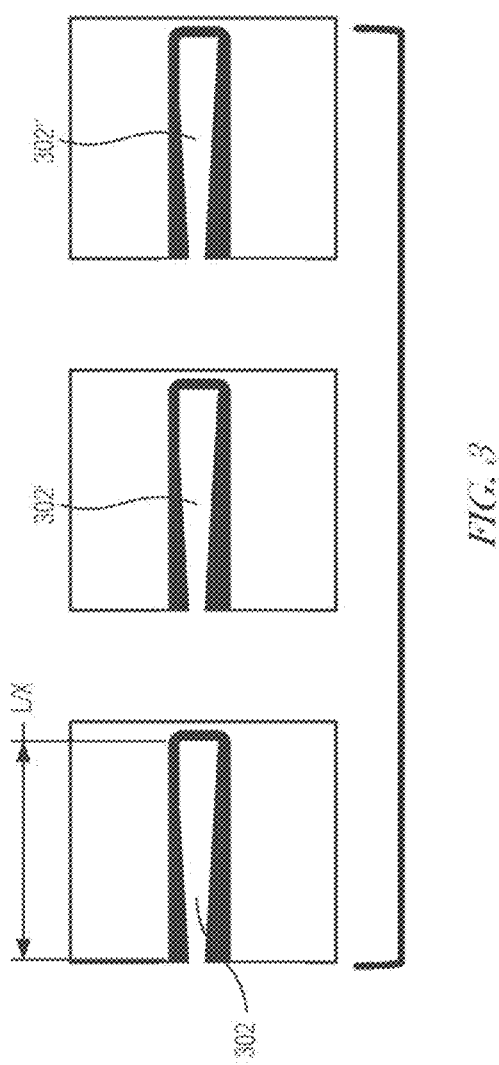

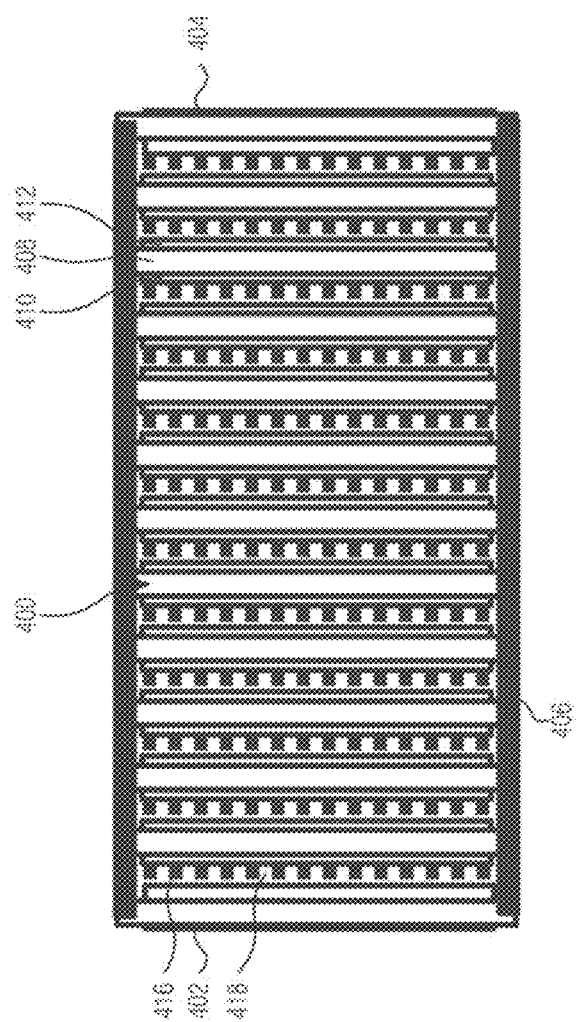

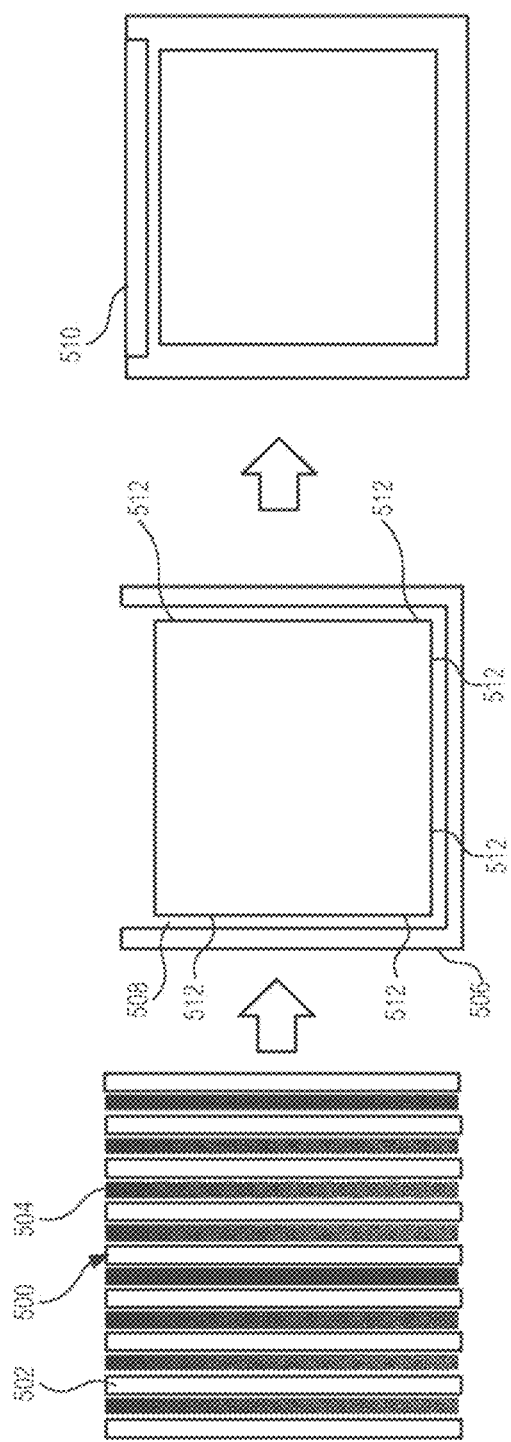

WAFER-BASED BIPOLAR BATTERY PLATE

CLAIM OF PRIORITY

This patent application is a continuation of and claims priority to U.S. patent application Ser. No. 14/477,312, filed Sep. 4, 2014, which claims priority to U.S. patent application Ser. No. 13/994,434, filed Dec. 3, 2013, which application is a U.S. National Stage Filing under 35 U.S.C. § 371 of International Patent Application Serial No. PCT/US2012/037598, filed on May 11, 2012, and published on Nov. 15, 2012, as WO 2012/155082, which claims the benefit of priority, under 35 U.S.C. Section 119(e), to U.S. Provisional Application Ser. No. 61/484,854, filed on May 11, 2011 and U.S. Provisional Application Ser. No. 61/525,068, filed on Aug. 18, 2011, each of which are hereby incorporated herein by reference in their entirety.

BACKGROUND

Battery technology, such as for electric vehicles and renewable energy applications, is an area of intense research and development. Work has focused on a number of technologies, with the most mature and successful ones being lithium-ion and lead-acid batteries. Despite this work, cost remains a central concern. Lithium ion, with its energy density, is attractive, but car-makers can pay $1,000/kW·hr or more for a lithium-ion power source. Costs remain high due to complex control and cooling systems in addition to electronics used to improve safety. This cost is at least six times the United States Advanced Battery Consortium (US-ABC) year 2020 target of $150/kW·hr. Contrast this with contemporary lead-acid batteries (lead-acid batteries), which can have a cost of around $150/kW·hr for renewable energy storage, but their limited energy density, cycle life, and efficiency in many cases discourages their use.

SUMMARY

Examples described below can improve upon contemporary batteries by providing a lead-acid battery formed of one or more very thin planar battery electrodes (e.g., less than 1.0 millimeter) having active mass (e.g., lead or a compound thereof) disposed on a very thin silicon substrate (e.g., less than 0.5 millimeters thick). Examples provide an improved battery that is less expensive and that performs better than other approaches. Because reliability and support infrastructure is important to widespread adoption, examples can employ technologies based on proven batteries chemistries, such as lead-acid. A plurality of these electrodes can be stacked together and packaged to provide a lead-acid that performs better than contemporary lead-acid batteries, such as by avoiding unbalanced ion depletion that can lead to nonreactive lead material. Examples of these batteries, and methods of making and using them, are described herein.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

The drawings, which are not necessarily drawn to scale, illustrate generally, by way of example, but not by way of limitation, various embodiments described in the present document.

FIG. 1A shows a schematic representation of a battery layer showing an aggregate of particles on a lead substrate, with arrows indicating the flow of ions, according to an example.

FIG. 1B shows a schematic representation of a simplified representation of the layer of FIG. 1A, according to an example.

FIG. 2A shows a pore with low current density, according to an example.

FIG. 2B shows a pore with high current density, according to an example.

FIG. 3 shows three layers with thinner active mass replacing a single layer, according to an example.

FIG. 4 shows a stacked or bipolar battery configuration, including alternating layers and spacers soaked with electrolyte, according to an example.

FIG. 5 shows a method for assembling the stacked battery. Battery layers and spacers are alternately stacked. The stack is placed in a frame. The gap between the stack and frame is filled with adhesive. After the adhesive sets, electrolyte is added (absorbed by the spacers) and a cap is placed on the top, according to an example.

DETAILED DESCRIPTION

Examples described herein can retain the low cost and market acceptance of lead-acid batteries while improving their performance such as to meet the needs of the electric vehicle and renewable energy markets. These examples can take advantage of the acceptance and maturity of the lead-acid battery and its infrastructure, providing a solution that is familiar to risk-averse markets. Many of the present examples may also be used to simplify manufacture or design of other types of batteries.

To frame the contributions of the present subject matter, it is helpful to consider attributes of conventional lead-acid batteries. Conventional lead-acid batteries have a number of limitations. First, conventional lead-acid batteries should run at low current for high efficiency in charging and discharging. This is because a reaction product, lead sulfate, can build up and block electrolyte diffusion, making active mass material (a.k.a. active material) located deep in the battery structure (referenced in the discussion of FIGS. 2A-B below) inaccessible to chemical reaction. This effect is known as Peukert's Law, which represents how battery capacity decreases as charging or discharging current increases. Due in part to this phenomenon, conventional lead-acid batteries should be charged or discharged over a long time, e.g. tens of hours, to show improved efficiency. Unfortunately, most renewable energy storage and vehicle applications desire much shorter discharge times, e.g., from 2 to 6 hours.

Second, conventional lead-acid batteries can demonstrate a reduced life when cycled at deep discharge. Active mass can expand 20-60% in volume as it converts from lead or lead oxide to lead sulfate. This expansion creates stress and can cause delamination of a pasted active mass (that is, active mass applied as a paste, which is a conventional commercial process). Because of this, conventional lead-acid batteries should be run in shallow discharge of from 40 to 60%. This can increase the number of batteries needed for some applications, doubling it in some instances.

Figure 14:
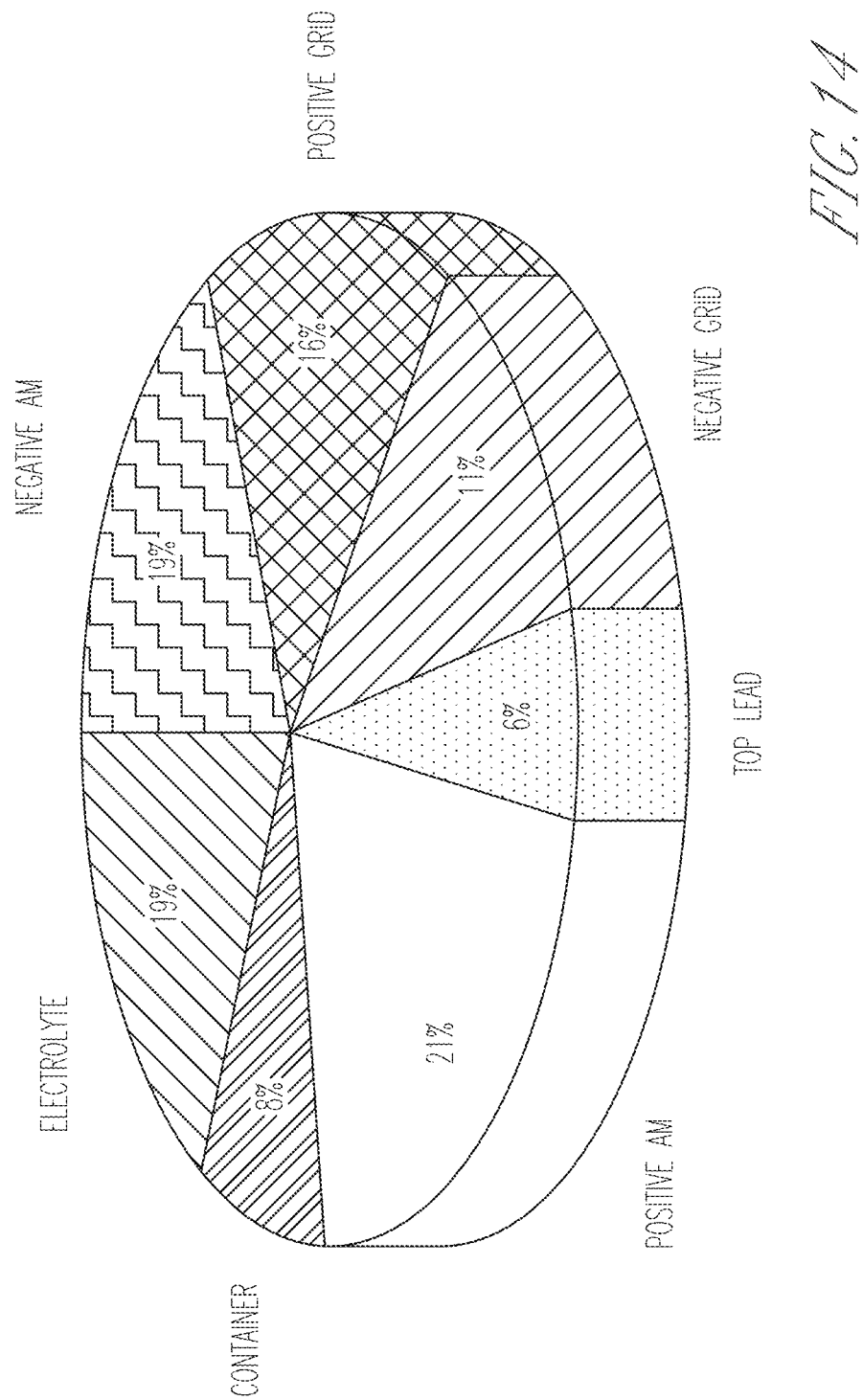
FIG. 14 is a chart showing weight distribution in a conventional lead-acid battery.

Third, high lead content can result in low energy density. Lead, which is resistant to the sulfuric acid electrolyte, is used in conventional batteries as active mass, as well as being used in terminals or top leads and to provide thick internal conductors to interconnect layers. Typical specific energies for lead batteries can be from 40 to 45 W·hr/kg, vs. a USABC target of 100 W·hr/kg. FIG. 14 shows the weight distribution in a conventional lead-acid batteries used for traction. The subject matter described here can eliminate or greatly reduce the negative active mass, positive and negative grid, and top lead components, removing about half the lead found in a conventional lead-acid battery. The subject matter described has the potential to eliminate weight (around half in some examples) and can increase (doubling in some examples) the energy density.

Fourth, conventional lead-acid batteries can be low voltage, high current devices. These properties are a poor match to higher voltage systems used in vehicles and renewable energy systems.

Attempts to overcome limitations of conventional lead-acid batteries have been met with obstacles. Low efficiency at high current affects batteries made with the conventional approach of using active material applied as a paste. This mature and low cost approach continues to be used in contemporary lead-acid batteries designs, including high-end batteries.

Efforts have been made to improve cycle life. One approach is to replace the negative active mass ("NAM") with a carbon electrode. Hydrogen can intercalate in the carbon in a manner similar to lithium intercalation in a lithium-ion battery. This can reduce or eliminate shedding on that layer. Another approach can integrate a supercapacitor with a conventional battery to provide extended life for repeated power bursts needed for start-stop cycles.

Lead content has been improved (i.e., decreased) and voltage has been improved (e.g., increased) with a bipolar lead-acid battery (such as Blead-acid batteries, or bipolar batteries). Examples can include a series-connected stack of cells, operating at high voltage and low current. This configuration can reduce or eliminate heavy internal conductors used in low voltage, high current batteries, and can provide a high voltage output.

Blead-acid batteries promises advantages such as high energy density by virtue of reduced conductor mass. However, several issues have limited commercialization. These include cell-to-cell leakage, layer degradation in a corrosive environment that includes both the sulfuric acid electrolyte and oxygen radicals formed during charging, active mass shedding, and electrode sagging that presents issues for layer separation.

An approach to address the layer degradation issue can use ceramic conducting $TiO_2$ substrates. The active material is a paste as in conventional lead-acid batteries. Ceramic layers can be less susceptible to sagging, but may be hard to manufacture in high volume at low cost.

However, even these approaches have shortcomings. Typical Blead-acid batteries designs do not address Puekert's Law limitations. The source of these limitations can be understood with the help of FIGS. 1A, 1B, 2A and 2B.

FIG. 1A shows a schematic representation of a battery layer showing an aggregate of particles on a lead substrate, with arrows 110 indicating the flow of ions, according to an example. The pasted active mass layer 102 can include an aggregate of particles 104 disposed on a substrate 108, which can be a few microns in diameter. Electrolyte can flow through channels between the particles. The channel diameter can be a few microns and the length can be substantially similar to the thickness of the active mass, 1-3 millimeters in some examples.

FIG. 1B shows a schematic representation of a simplified representation of the layer of FIG. 1A, according to an example. As depicted in FIG. 1B, channels 106 can be theoretically modeled as straight channels. At low currents, the electrolyte ions can diffuse the length of the channel with low, or even without, depletion, and the reaction can proceed along the full length of the channel 106. At high currents, the electrolyte ions can be consumed before they can diffuse the full length of the channel 106. As a consequence, at high currents the active mass deep in the layer does not react as desired, and the available energy, which is associated with available reactions with the AM, can decrease.

FIG. 2A shows a pore with low current density, according to an example. FIG. 2B shows a pore with high current density, according to an example. In these examples, channel 206, which represent pores 208, have a lead sulfate coating 210. The current at onset of ion depletion scales as $1/L^2$, where L is the channel length. The narrowing 212 represents that more reactions have taken place than at less narrow portions.

FIG. 3 shows three layers with thinner active mass replacing a single layer, according to an example. One solution to the problem of unbalanced ion depletion is to split the active mass into several thinner layers, as shown in FIG. 3, in which the length "L" shown in FIG. 2 has been reduced by a factor of 1/X to provide a shorter channel 302. To compensate for the reduction in total channel length by the 1/X reduction, more channels 302', 302" can be used. They may total X in number, but other numbers are possible. Such a configuration can retain the same amount of active mass, so the battery can retain the same or a similar capacity. Because of the shorter channels, the battery can run at higher current while accessing a greater portion of the active mass. For example, dividing a single 1 millimeters thick active mass layer into three 0.3 millimeters thick active mass layers provides 9 times more current without loss of capacity.

This approach and others disclosed herein can be used to overcome shortcomings described above. New systems and methods described herein provide battery layers with thin active mass layers. These layers can be closely spaced, and the amount of active mass can remain constant to retain a desired battery capacity. Additionally, these thin active mass layers have other desirable attributes.

For example, a lead layer expands about 60% when converted to lead sulfate, and the lead oxide layer expands about 20%. This expansion can cause shedding of the active mass in deep cycling. A thinner layer has less mechanical stress at the interface, and is less likely to shed, allowing the battery to operate reliably in deep cycling.

Examples disclosed herein provide a bipolar lead-acid battery with layers that can be much thinner than conventional plates, which can enable balanced ion depletion. Silicon wafers can be used as substrates and provide layers that are light, resistant to reaction with sulfuric acid, and that are inexpensive. Active mass layers can be formed using plating or electrophoretic deposition instead of pasting, enabling controlled formation of thin layers. The composition can be varied in depth to provide for selected critical properties such as porosity, grain size, and stress. Contact and barrier layers can be included. A sacrificial template process is described by way of example to provide controlled porosity, employing one or both of deposition of a sacrificial layer and co-deposition using electrophoresis. Methods to package the battery are also described, and can include sealing a stack of layers in a molded form, adding electrolyte, and affixing a cover.

Examples provide a bipolar lead-acid battery design that enables the use of thin layers to provide a battery with an increased layer density over that of conventional batteries. Examples allow spreading the active mass over a large number of thin layers to reduce the effect of Puekert's Law, enabling deep cycling (i.e., balanced ion depletion) with reduced shedding of active mass. Examples provide a high voltage output suitable for electric vehicle and renewable energy systems. Examples use less (half in some examples) of the lead of conventional lead-acid batteries, which can increase (double in some examples) energy and power density.

FIG. 4 shows a stacked or bipolar battery configuration, including alternating plates and separators or spacers soaked with electrolyte, according to an example. A electrochemical battery has two terminals: a cathode (positive) and anode (negative). A reduction reaction occurs at the cathode and an oxidation reaction occurs at the anode. The battery potential is the sum of the half-reaction voltages. In the case of lead-acid, the positive plate is typically lead oxide, and the half-reaction voltage is about 1.6 volts. The negative plate is typically lead, and the half-reaction voltage is 0.4 volts.

A battery cell includes, at a minimum of an anode and cathode. Voltages for cells wired in series are additive. Accordingly, 10 lead-acid cells connected in series can provide 20 volts (e.g., 10 cells×2 volts/cell). In an example series connection, the string can include a series of anodes connected to cathodes, with the intervening electrolytes electrically isolated.

The example includes a stack 400 of layers such as plates 408 packaged with spacers 406. The stack 400 can include one or more anodes 410 separated from cathodes 412, such as by spacers or separator. Gaps between the plates can be filled with sulfuric acid electrolyte. The electrolyte masses or volumes can be electrically isolated so that the plates can be in series. The spacer material can be fiberglass, which is porous and can absorb sufficient sulfuric acid. The plate spacing can be 0.5 millimeters.

Separators or spacers 406 can prevent shorting of the plates, and can be thin sheets of fiberglass. In some cases, the plates are stiff, and in some of those examples spacers are not necessarily used. Electrolyte, which can be sulfuric acid, can be disposed in a space between plates. Electrolyte can be soaked into the spacers.

If multiple electrolyte masses or volumes can be electrically isolated from one another, and there is a conduction path from the anode to the cathode, such as through the use of plates that are conductive, the stack can form a series-connected arrangement of cells. Voltage can be equal to $(N-1)V_{Cell}$, where N is the number of plates (with one at each end for connection to the positive 404 and negative 402 terminals), and $V_{Cell}$ is the voltage of a single cell. For example, the cell voltage for the lead-acid reaction can be around 2 volts. Accordingly, a battery having 101 plates can have a voltage of 200 volts. A housing is shown, mechanically maintaining multiple cells in a stack.

Examples can include electrically conducting substrates with an anode on one side and cathode on the other. The substrate can act as the conductor or "wire" to connect the cells together while isolating the electrolytes from one-another. In some examples it is possible to eliminate the lead electrode entirely by using a carbon or silicon counter-electrode. This can provide even higher energy density. Such examples can use bare silicon or carbon coated silicon as the counter electrode to the lead oxide electrode.

Note that the cathode can provide most of the cell voltage. Some cases omit lead as the material for the half cell reaction at the anode while providing a place for a reduction reaction to occur on that side of the cell. One way to accomplish this is to allow protons from the electrolyte solution to react (intercalate), as occurs in other types of batteries such as lithium ion. This reaction operates in both carbon and silicon. In such a case, the cell voltage can be at least 1.6 volts (the cathode half-cell potential), but the mass and weight of the lead on the anode can be reduced or eliminated, resulting in an increase in power and energy density and reductions in cost and toxic material content. Life can also be extended because lead suffers the greatest expansion when it converts to lead sulfate, and therefore undergoes the greatest stress. The loss of voltage can easily be made up by adding more series-connected cells.

An exposed leftmost electrode 402 can serve as a terminal, such as for coupling electrically and mechanically with electronics. The exposed major face of the rightmost terminal 404 can serve as an electrode of the opposite polarity, and can serves as a terminal as well. However, in some examples, the stack is disposed in a housing or container and is connected to electronics outside the housing via one or more feedthroughs extending through the housing.

The anode is shown having a plurality of protrusions 416 defining channels 418. However, the present subject matter is not so limited, and examples in which the cathode has protrusions are also contemplated, as are examples in which no protrusions are used.

An unexpected result is that such a battery can in some examples, use silicon wafers with standard solar cell texture. Some examples use textured silicon, such as cut wafers. As-cut silicon wafers, originally used for solar cells, can be used as the substrates for the electrodes. These wafers are light (about a quarter the density of lead), can be resistant to sulfuric acid corrosion, and can be generally available at low cost by virtue of their high volume of use. As-cut wafers can have a surface roughness that provides good adhesion, such as for mechanically joining with a coating. For example, multi-crystal (MC) wafers can be formed by iso-texturing, such as in a bath of hydrofluoric acid and nitric acid.

Multi-crystalline wafers can provide a square form factor and lower cost. Single crystal wafers can also be used. Single crystals can have a pyramidal texture, typically formed with a potassium hydroxide ("KOH")/isopropyl alcohol etch. Because large grain size is not as important, MC wafers can be made more rapidly than they are for solar applications, which can provide for lower cost. A lower cost metallurgical grade silicon can be used, as its purity is compatible with battery applications disclosed herein. Other silicon, such as electronic, solar or semiconductor grade can be used, but are generally more expensive.

In some examples, wafers can be doped. Doped wafers can have a resistivity typically less than 1 $\Omega$-cm. In some examples, the resistivity can be less than 0.001 $\Omega$-cm. Lower resistivity can improve efficiency as battery current flows through the wafers. Low resistivity can also improve the quality of contacts to the silicon. Dopants can be used, such as phosphorus, boron, antimony or arsenic. Such wafers can be less than 500 µm (0.5 millimeters) thick, and can be less than 200 µm thick.

Wafers can be square, with an edge length of 156 millimeters for standard solar cell wafers, although rectangular wafers, or wafers with other form factors such as clipped corners can also be used. Use of a standard edge length can enable the use of wafers manufactured in high volume, which can reduce cost, although other edge lengths can be used. Use of standard size wafers can allow for the use of standard manufacturing equipment to handle and process the wafers during battery manufacturing.

In certain examples, active mass can be formed on one or both sides of a substrate. Lead can be plated onto both sides. One plated side can be masked and the other can be exposed to a sulfuric acid bath. While exposed, a current can be run through such a bath using a lead negative electrode. Such an approach can convert the exposed side to lead oxide using a process termed "forming."

In certain examples, only one side of the silicon substrate is coated with lead and converted to lead oxide or, alternately, coated with lead oxide. In one-sided examples, the battery can have a lower voltage that an example with active material lead coated on both sides. In some examples, the half-cell potential for lead oxide to lead sulfate reaction can be 1.68 volts. A battery with lead coated on only one side can use less (e.g., half) lead, so it can be less toxic and lighter in weight. In addition, lead can expand more than lead oxide when converted to lead sulfate, so plates without a lead coated side can experience less stress during cycling.

According to various examples, either one or both sides can be coated with active mass. Other materials can be used as active mass and the use of the silicon plates is not exclusive to lead-acid type batteries. In some instances configured as single-sided, hydrogen can intercalate into the silicon on the opposite electrode, much as lithium does in a lithium-ion battery. Note that a silicon surface can be coated with an inert material such as carbon, and hydrogen can intercalate into the carbon. Such intercalation can be beneficial, as it can help a cell resist bulging due to gas production.

FIG. 5 shows a method for assembling the stacked battery. On the left, a side view of battery plates and spacers alternately stacked is shown. As illustrated, alternating layers of plates 502 and fiberglass spacers 504 can be stacked, as shown in the left drawing in FIG. 5. Note that there can be a plate at each end to form the positive and negative terminals or poles of the battery. The battery stack can be placed in a U-shaped frame 506 that provides three sides. An adhesive that is resistant or impervious to sulfuric acid, such as epoxy or any of a number of plastics resistant to sulfuric acid, such as polypropylene, can be injected into the space 508 between the u-shaped frame 506 and the battery stack 500. After the adhesive has set electrolyte can be added and a cover 510 can be put in place. In some examples, fiberglass spacers can resist or prevent adhesive from seeping into the space between the plates any more than a small region near the edges of the faces of the plates. It can be helpful to seal the edges 512 of the stack so that the electrolyte masses (i.e., volumes with electrodes of opposite polarity on opposing sides) can be electrically isolated. In some cases, laser cut grooves can be formed near the periphery of the plates, using laser grooving equipment common in solar cell manufacturing. Such grooves can be 10-20 µm deep and on the order of 50 µm wide. This can provide a re-entrant structure to improve the quality of the edge seal.

Figure 6:
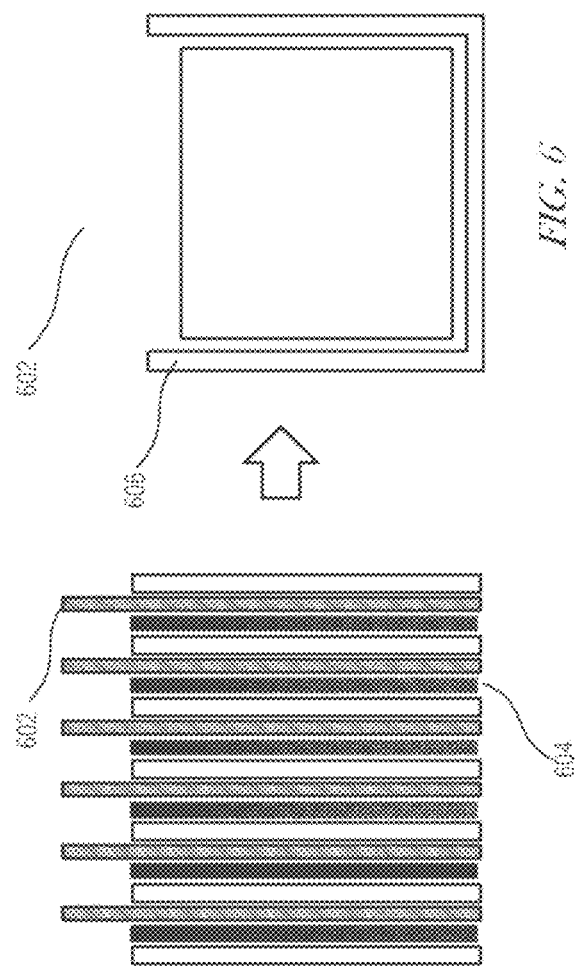
FIG. 6 shows a method for assembling the stacked battery using removable spacers, according to an example.

FIG. 6 shows a method for assembling the stacked battery using removable spacers, according to an example. In some cases it is desirable to have additional space in the gap 604 between the plates, thereby providing room for extra electrolyte. One example providing this space is the use of removable spacers 602, as shown in FIG. 6. A battery stack can be made with spacers 602 that extend out of the stack on the top side, as shown in the side view on the left. The battery stack can be placed in a U-shaped frame 606, shown in front view in the center, that provides three sides. An adhesive that is resistant or impervious to sulfuric acid, such as epoxy or any of a number of plastics resistant to sulfuric acid, can be injected into the space between the U-shaped frame 606 and the battery stack 600. After the adhesive or plastic sets, the spacers can be pulled out, electrolyte can be added, and a cover 610 can be put in place. The cover 610 can have a vent to prevent gas pressure build-up if the battery is overcharged, and can be removable to allow recharging of electrolyte.

Figure 7C:
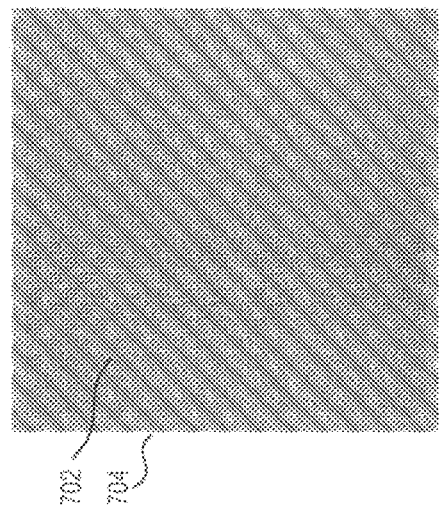
FIG. 7C shows a fiberglass spacer having an edge lining of a fiberglass spacers, according to an example.
Figure 7B:
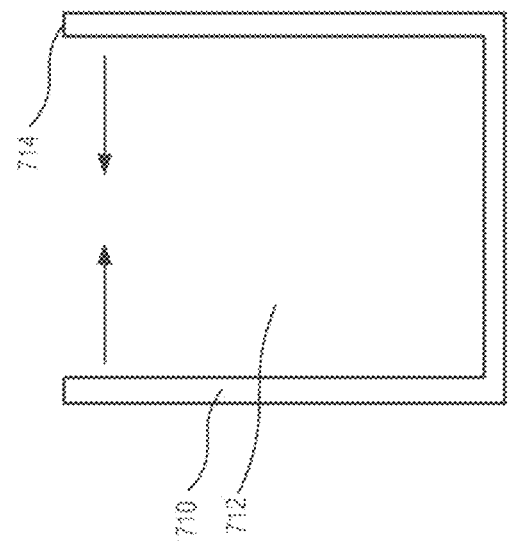
FIG. 7B shows a front view of a U-shaped spacer, according to an example.
Figure 7A:
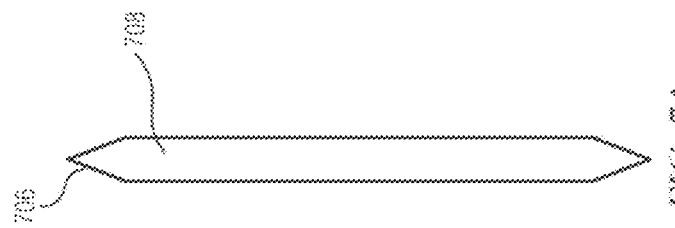
FIG. 7A shows a top view of a plate-shaped spacer including tapered edges, according to an example.

FIG. 7A shows a top view of a plate-shaped spacer including tapered edges, according to an example. The edges of the spacers can be tapered, as shown in FIG. 7A, which is a top view. The tapered edges 706 extending away from a main body 708 can reduce contact area between the spacer an another structure such as a frame, providing for easier removal. They also provide a tapered region that can be filled with the epoxy or plastic to provide an improved seal.

FIG. 7B shows a front view of a U-shaped spacer, according to an example. As illustrated in FIG. 7B, spacers can be U-shaped, with a spacer portion 710 defining an inner void 712. Such a spacer can allow for removal by pinching the ends 714 in the direction of the arrows and lifting the spacer out of a frame, a process that can permit air to enter the frame to ease spacer removal.

FIG. 7C shows a fiberglass spacer having an edge lining of a fiberglass spacers, according to an example. In some cases, fiberglass separators can wick the glue so that it extends excessively into the space between the plates. Forming an edge liner 704 around the fiberglass spacers 702, as shown in FIG. 7C, can prevent this. In some examples, the fiberglass can be melted to form a glass frame that does not wick adhesive. In some examples, adhesive or plastic can be applied to the rim of the spacers to form a frame consisting of set adhesive. In some examples, the edge liner can be soft and flexible if an appropriate adhesive such as silicone is used.

The spacers can be made of a non-stick material such as Teflon, or can have a Teflon coating to ease removal. They can also have holes through the top that can be aligned so that one or more rods can be passed through the set of spacers, simplifying alignment and removal. A mold release material can be applied to one or more surfaces to provide for easier removal.

In some examples, the edges of the silicon plates may have nicks or defects resulting during their manufacture. These nicks can cause the plates to break when handled. The plates can be coated with epoxy or plastic before assembly. This is called pre-coating. It can protect the edges, to reduce the risk of breaking wafers. The coating can be by dipping or direct application. In some examples, the coating thickness equals half the plate separation. In some examples, the plates can be stacked and an additional layer of epoxy or plastic applied to form the outer housing of the battery. The pre-coating material can be a plastic substantially resistant to sulfuric acid. The sum of the thicknesses of the pre-coating on plate faces can be approximately equal a plate separation between plates.

Figure 8:
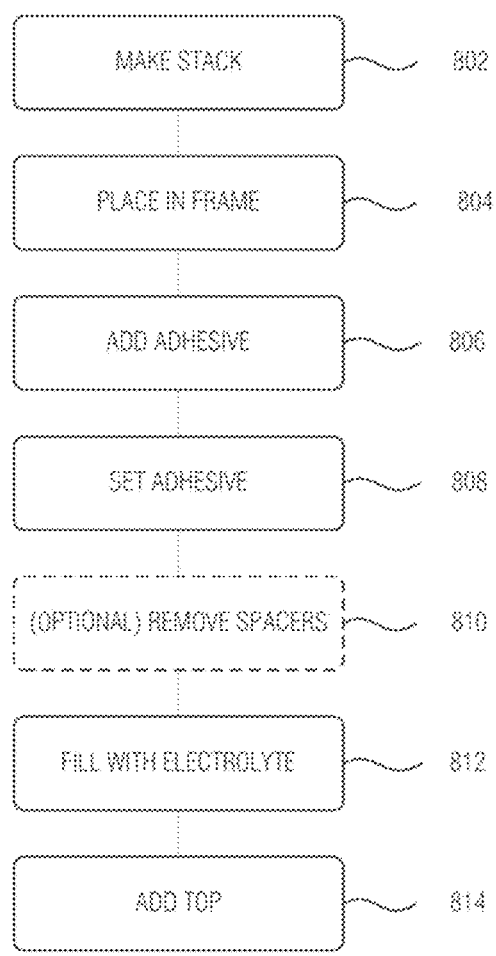
FIG. 8 shows a flow chart of a battery assembly process, according to an example.

FIG. 8 shows a flow chart of a battery assembly process, according to an example. The process can be used to produce the examples discussed in FIGS. 4-6 and other disclosed herein. At 802, electrodes are placed into a stack. At 804, the electrode stack is placed in a frame. At 806, adhesive is added to adhere the stack to the frame. At 810, an optional step allows for removal of at least some spacers. At 812, one or more interior space defined between electrodes adhered to the frame can be filled with electrolyte. At 814, a cover or top can be added to the frame to seal in the electrolyte.

Figure 9D:
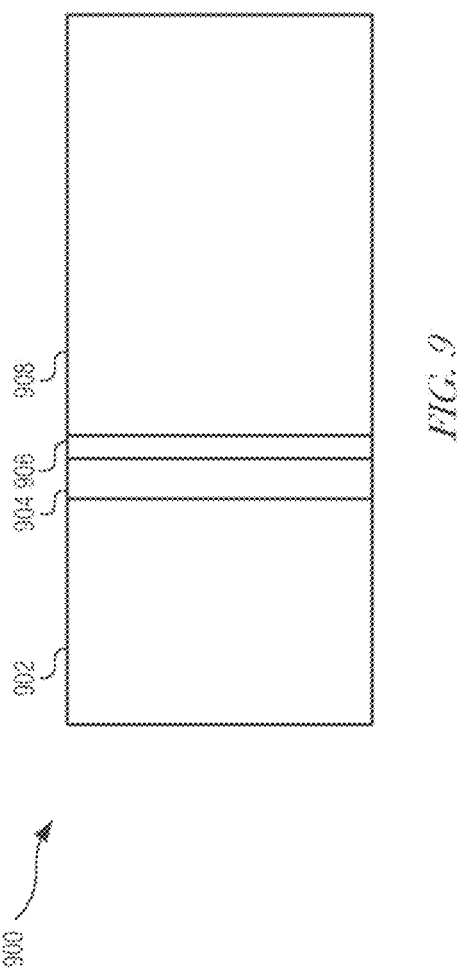
FIG. 9 is a cross-sectional view of a battery layer with an active mass coating showing different layers, from left to right showing silicon, nickel silicide, barrier layer, lead oxide, according to an example.

FIG. 9 is a cross-sectional view of a battery plate with an active mass coating showing different layers, from left to right showing silicon, nickel silicide, barrier layer, lead oxide, according to an example. FIG. 9 shows an example multiple layer stack. The figure shows a plate 900 comprising silicon 902, nickel silicide 904, a barrier layer 906 and lead oxide 908. It should be noted that it is often desirable to remove any native oxide from the silicon before applying a layer. This can be done with sandblasting or using a chemical etch such as buffered hydrofluoric acid.

It can be beneficial to form layers between the silicon substrate and the active mass. One benefit is to improve contact between the substrate (e.g., silicon) and the active mass. Some examples interpose a silicide layer between the substrate and the active mass. Some examples interpose a nickel silicide layer between the substrate and the active mass. Such a layer can be formed using an electroless nickel deposition or a vacuum process such as evaporation or sputter deposition. Some examples include a heating cycle such as at 500° C. Some examples heat for around 10 seconds. A silicide layer can be formed on the opposite side to improve contact to the inert layer (e.g., carbon) or to the electrolyte. In some examples, other silicides such as molybdenum, titanium, tungsten and their alloys can be used instead of or in addition to nickel.

Additional layers can be added for protecting the silicon from reaction with the electrolyte and to improve adhesion of the active mass to the substrate. Such layers can include TiN, TaN, molybdenum selenide, tin or chrome, and can be formed on one or both sides of the substrate. Methods of deposition include, but are not limited to, sputtering, reactive sputtering or evaporation. Barrier or adhesion layers can be relatively thin, such as from 20 to 100 nm.

Figure 10:
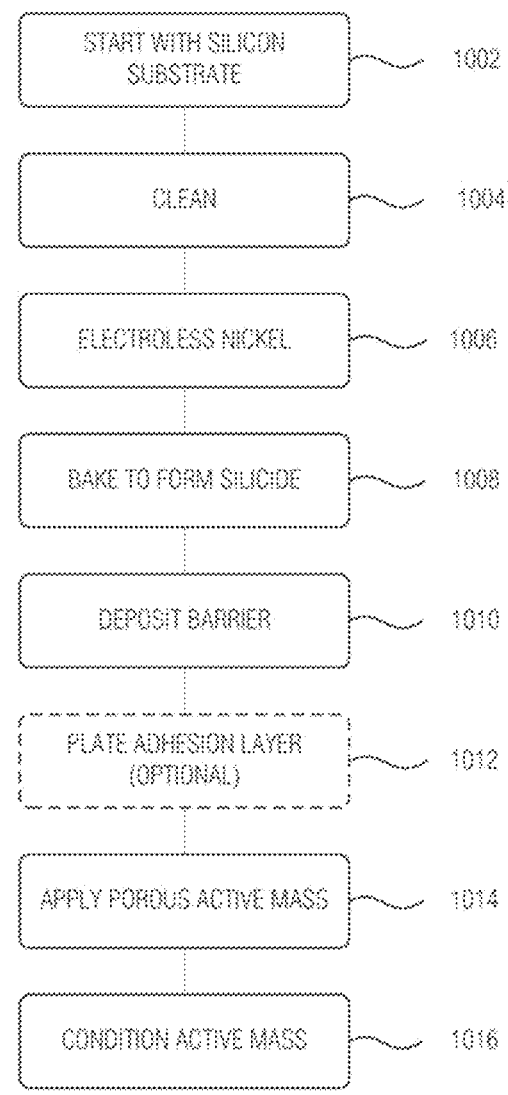
FIG. 10 is a flow chart of the process for making the battery layer, including formation of a silicide contact and addition of layers to form a barrier to protect the layer from acid corrosion and to promote adhesion of the active mass, according to an example.

FIG. 10 is a flow chart of the process for making the battery plate, including formation of a silicide contact and addition of layers to form a barrier to protect the plate from acid corrosion and to promote adhesion of the active mass, according to an example. The process can be used on one or both faces of a layer. At 1002, the method starts by providing a silicon substrate. At 1004, the substrate can be cleaned to remove contamination and organic deposits. Cleaning solutions that can be used include a mixture of sulfuric acid and hydrogen peroxide to remove organics. The surface can also be etched in hydrofluoric acid to remove any oxide layer that forms after the sulfuric/peroxide clean, or can be sandblasted. At 1006, electroless nickel can be deposited. Optionally, electroless nickel can be can be vacuum deposited as described above. At 1008, the deposit can be baked. Such a deposit can be heated at 300-700° C., such as for 30 seconds to form a silicide contact layer. At 1010, a barrier can be deposited. The barrier can be plated or sputtered, among other methods of forming. At 1012, an adhesion and/or barrier layers can be deposited. At 1014, the active mass can be formed using methods described herein. At 1016, the active mass can be conditioned, for example, to turn it from lead to lead oxide. In some examples, lead can be plated directly to the silicon. The lead can optionally be heated at 200° C. for 5 minutes to improve contact and adhesion.

Examples can form an active mass with controlled porosity and pore size. In some examples, the active mass can be plated. The active mass can be less than 1 millimeter thick. Some examples are from 0.2 to 0.3 millimeters thick.

In some examples, the active mass can include lead(IV) oxide, $PbO_2$. The notation lead "(IV)" refers to lead with a valence of +4. A plated material can also include lead, which can be electrolytically converted to $PbO_2$ using forming or conditioning. In some conditioning processes, current can be run through the plate in a 6 molar sulfuric acid bath to convert it to lead sulfate. The current can be reversed to form lead oxide on a positive plate.

Figure 11:
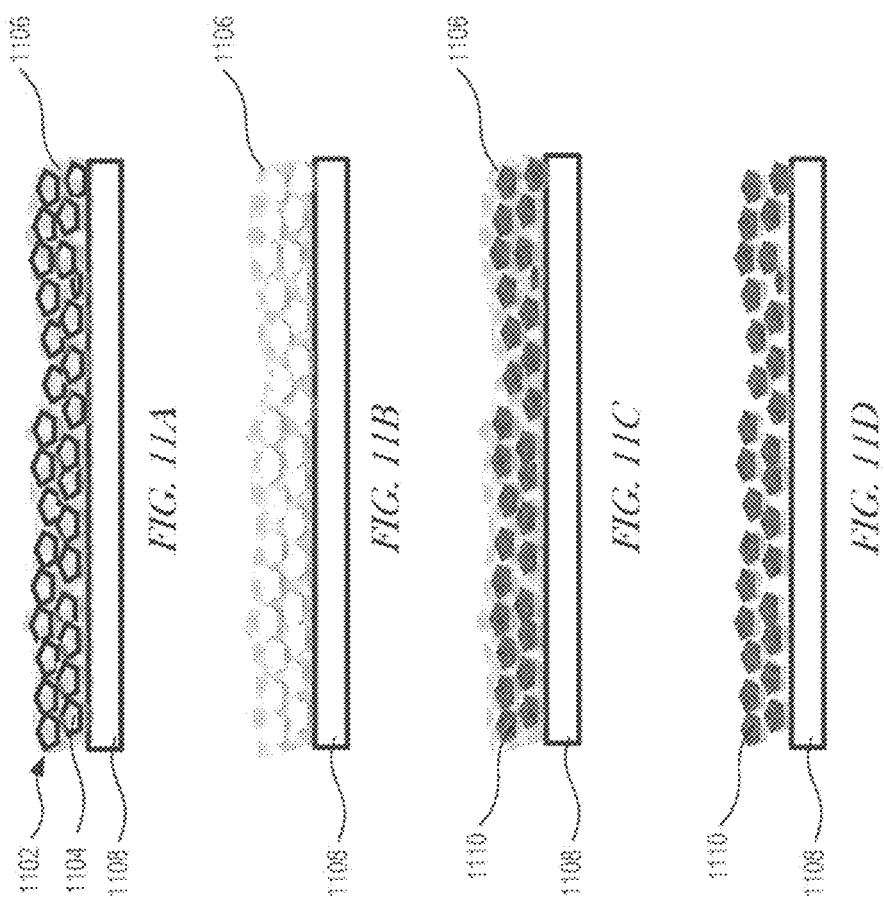
FIG. 11A shows a mix of particles and a matrix, according to an example.
FIG. 11B shows the matrix once the particles are removed, according to an example.
FIG. 11C shows the matrix with plating, according to an example.
FIG. 11D shows the matrix removed, according to an example.

FIGS. 11A-C show a pictorial representation of the process of making a porous active mass, according to an example. A deposition can be made porous using various methods. In some examples, additives can be put in the plating solution, such as those used to make a matte finish plating. In some examples, a sacrificial layer 1102 can be used. A mix of fine soluble particles 1104 and a matrix material 1106 such as a cured resin such as paraffin wax or a polymer such as etch-resist can be prepared. The particles 1104 can have the same size as the active mass grains, which can be around 5 µm diameter. They can be of a soluble material such as a crystalline salt, sodium chloride being one example. The mix can be applied to the substrate 1108, which can be heated to allow the matrix (e.g., paraffin) to flow. The mix can be allowed to solidify, by, for example, cooling or evaporation of organic constituents. The wafer can be placed in water so that the soluble particles 1104 dissolve. Such a process can produce a porous organic matrix 1106.

Once the porous matrix is created, the wafer can be placed in a plating bath. The active mass material can be plated into the pores. The matrix 1106 can be thicker than the plating 1110 thickness, which can be determined by the plating time and current. The matrix can be dissolved in a solvent to leave the porous active mass layer, which can be conditioned to form lead(IV) oxide if the original plating material was lead.

In some examples, electrophoretic deposition can be used to deposit the active mass. Electrophoresis is a process in which charged particles can be attracted to an electrode. In an example process a suspension of active mass particles can be made in an ethanol bath, such as by using ultrasonic agitation. One benefit of ethanol, and compositions thereof, is that it is a poor conductor of electricity, so a field can be established across the bath. A small amount of sulfuric acid can be added to the suspension, for example 0.5 milliliters per 100 milliliters of bath. Such an addition can provide a source of ions to charge suspended active mass particles. The electrode to be coated can be placed in the bath and connected to the negative terminal of a voltage source, such as a 50-200 volt source, with an electrode spacing on the order of 2-5 centimeters. The potential urges active mass particles to the surface, where they deposit. A coated plate can be baked at a temperature exceeding 100° C. Some examples are baked at 200° C. for 30 minutes. Baking can drive ethanol out of the coating.

Other materials can be co-deposited with this method, including, but not limited to, fiber and chemical binders. Such materials can improve adhesion and the integrity of the film. Integrity as used herein refers to resistance to flaking or decomposition of the active mass layer. A soluble species such as salt grains can also be co-deposited, and can be dissolved as described above to control film porosity. This has the advantage of reducing or eliminating the need for sacrificial paraffin and subsequent plating steps.

Figure 12:
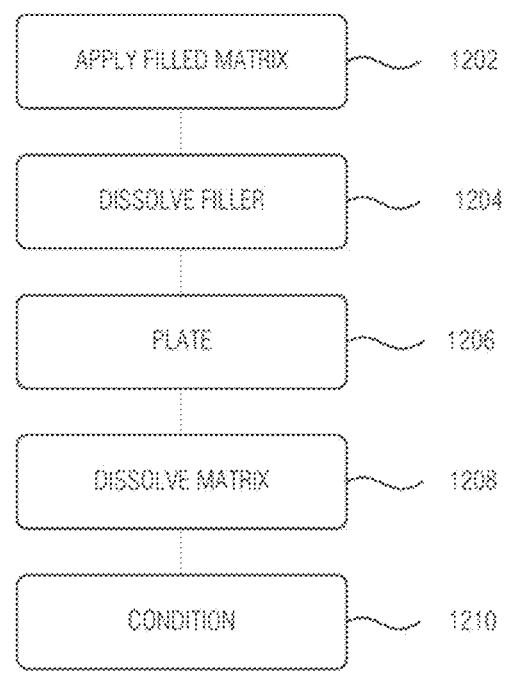
FIG. 12 is a flow chart for formation of a porous active mass, according to an example.

FIG. 12 is a flow chart for making a porous active mass, according to an example. The flowchart can be used to make the apparatus of FIG. 11. At 1202, a filled matrix can be applied to a substrate. At 1204, filler in the matrix can be dissolved. At 1206, the matrix can be plated. At 1208 the matrix can be dissolved. At 1210 the remaining material can be conditioned.

Figure 13:
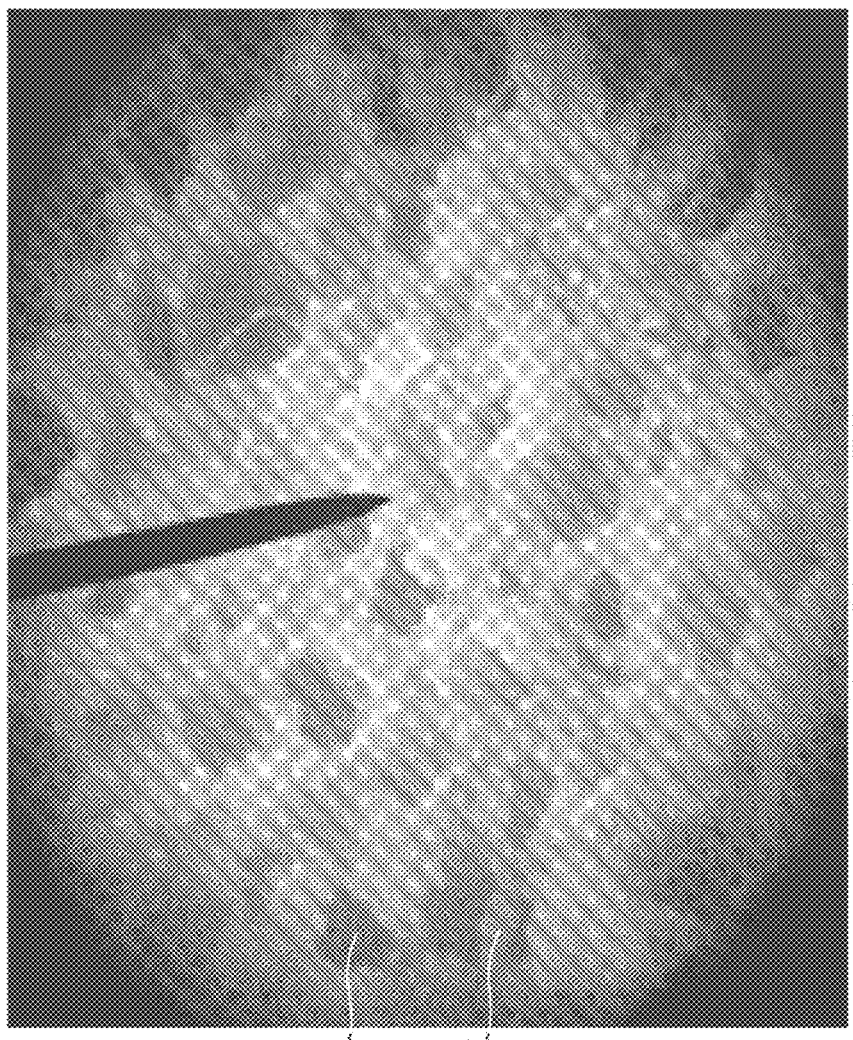
FIG. 13 is a micrograph of a wax matrix with pores from dissolved salt particles, according to an example.

FIG. 13 shows a micrograph 1300 of a paraffin matrix 1302 with holes 1304 left behind after salt crystals have been dissolved. The ratio of matrix material to particles can determine the porosity. Particle size and shape can determine the pore size. The mixture can contains 50-70% solids. A high solid fraction can encourage the formation of pores that are continuous, which enables thorough plating throughout the matrix. In some cases matrix material wets the top surface, in which can the surface can be lightly scraped to expose salt.

The consistency of the active mass can be varied in depth. For example, multiple sequential depositions can be layered on top of one another. During a deposition, parameters can be altered, making it possible to vary parameters such as grain size, porosity, composition, or film stress.

Various Notes & Examples

Example 1 can include or use subject matter (such as an apparatus, a method, a means for performing acts, or a device readable medium including instructions that, when performed by the device, can cause the device to perform acts), such as a stack of electrodes, including: a first electrode including a silicon substrate and an active material or active mass disposed on the silicon substrate, a second electrode disposed in the stack in alignment with the first electrode, and a separator disposed between the first electrode and the second electrode. The example can include a housing, with the stack of electrodes disposed in the housing, electrolyte filling the housing and in contact with the first electrode and the second electrode, a seal coupled between the housing and the stack to define an interior space extending between the first electrode and the second electrode, the seal adapted to resist the flow of electrolyte from the interior space, a cover coupled to the housing, and a cover seal adapted to resist the flow of the electrolyte from inside the interior space.

Example 2 can optionally can optionally include the subject matter of any of the preceding examples 1, wherein a major face of the first electrode is exposed to an exterior, the second electrode is of a different polarity, and a second major face of the second electrode is exposed to an exterior, opposite the first major face.

Example 3 can optionally include the subject matter of any of the preceding examples, wherein the active material includes lead (or a lead compound) and the electrolyte includes sulfuric acid.

Example 4 can optionally include the subject matter of any of the preceding examples in which at least one intervening layer is disposed between the substrate and the active material.

Example 5 can optionally include the subject matter of any of the preceding examples wherein the intervening layer is formed of at least one of a group including TiN, TaN, molybdenum selenide, tin and chrome.

Example 6 can optionally include the subject matter of any of the preceding examples wherein the intervening layer includes a silicide.

Example 7 can optionally include the subject matter of any of the preceding examples wherein the silicide includes tungsten, titanium, nickel or molybdenum.

Example 8 can optionally include the subject matter of any of the preceding examples, wherein the substrate is less than 0.5 millimeters thick and the active material is less than 0.5 millimeters thick.

Example 9 can optionally include the subject matter of any of the preceding examples, wherein the substrate has a cut surface onto which the active material is disposed.

Example 10 can optionally include the subject matter of any of the preceding examples, wherein the active material is porous.

Example 11 can optionally include the subject matter of any of the preceding examples, wherein a major face of the substrate has a rectangular perimeter, with side lengths of approximately 156 millimeters.

Example 12 can optionally include the subject matter of any of the preceding examples, including forming a battery electrode by disposing an active material coating onto a silicon substrate, assembling the battery electrode into a stack of battery electrodes, the battery electrode separated from other battery electrodes by a separator, disposing the stack in a housing, filling the interior space with electrolyte, and sealing the housing to resist the flow of electrolyte from the interior space.

Example 13 can optionally include the subject matter of any of the preceding examples in which the plated coating is lead, and further including oxidizing the coating after application to form lead(IV) oxide.

Example 14 can optionally include the subject matter of any of the preceding examples, including forming a silicide between the substrate and the active material by disposing a nickel onto the substrate and heating the substrate.

Example 15 can optionally include the subject matter of any of the preceding examples wherein disposing the nickel includes plating the nickel including applying the nickel using electroless deposition.

Example 16 can optionally include the subject matter of any of the preceding examples in which the silicide is formed by sputtering or evaporating a metal and heating the substrate.

Example 17 can optionally include the subject matter of any of the preceding examples, wherein the active material is a porous plated active material formed by: disposing a sacrificial layer of matrix material and particles onto the substrate, dissolving the particles to form a matrix with pores, plating active material into at least some pores, and dissolving the matrix.

Example 18 can optionally include the subject matter of any of the preceding examples, wherein disposing the active material onto the substrate includes applying the substrate using electrophoresis.

Example 19 can optionally include the subject matter of any of the preceding examples, including mechanically fixing the stack to the housing to define an interior space, with the separator disposed in the interior space, and removing the separator.

Example 20 can optionally include the subject matter of any of the preceding examples, wherein disposing the active material includes electrophoretic co-deposition of the active material along with a sacrificial material, and defining a porous active material by dissolving the sacrificial material after electrophoretic co-deposition.

Example 21 can optionally include the subject matter of any of the preceding examples, in which the silicon substrate is highly doped.

Example 22 can optionally include the subject matter of any of the preceding examples in which the silicon resistivity is less than 1 Ω-cm.

Example 23 can optionally include the subject matter of any of the preceding examples which the substrate has an as-cut surface.

Example 24 can optionally include the subject matter of any of the preceding examples which the silicon has a standard solar cell texture.

Example 25 can optionally include the subject matter of any of the preceding examples which the silicon is metallurgical grade material.

Example 26 can optionally include the subject matter of any of the preceding examples which the substrate is multi-crystal silicon.

Example 27 can optionally include the subject matter of any of the preceding examples including a process for applying an active mass coating to a silicon battery plate in which the coating is plated or deposited using electrophoresis.

Example 28 can optionally include the subject matter of any of the preceding examples in which the plated or electrophoresis deposited coating is less than 1 millimeters thick.

Example 29 can optionally include the subject matter of any of the preceding examples, including intervening layers between the silicon substrate and active mass to promote adhesion of the active mass to the battery plate.

Example 30 can optionally include the subject matter of any of the preceding examples in which an additive is included in the plating solution to promote porosity.

Example 31 can optionally include the subject matter of any of the preceding examples in which a sacrificial layer is applied to the battery plate, said sacrificial layer consisting of a matrix material and particles, said particles being subsequently dissolved to form a matrix with pores, at least a portion of said pores being then filled by plating and said matrix being subsequently dissolved, in which the matrix material is at least one of wax and a polymer.

Example 32 can optionally include the subject matter of any of the preceding examples in which said particles are a crystalline salt.

Example 33 can optionally include the subject matter of any of the preceding examples in which the crystalline salt is sodium chloride.

Example 34 can optionally include the subject matter of any of the preceding examples that also includes porous spacers between plates.

Example 35 can optionally include the subject matter of any of the preceding examples in which the porous spacer material includes fiberglass.

Example 36 can optionally include the subject matter of any of the preceding examples in which a stack is formed including alternating battery plates, porous spacers, and removable spacers, said stack is then placed in a containment fixture, sealant is applied to the periphery of said stack, and said removable spacers are removed after said sealant sets.

Example 37 can optionally include the subject matter of any of the preceding examples in which three sides are sealed, the spacers removed, electrolyte added, and a top cover placed on the battery.

Example 38 can optionally include the subject matter of any of the preceding examples in which one or more edges of the removable spacers are tapered.

Example 39 can optionally include the subject matter of any of the preceding examples in which a release coating is applied to the removable spacers.

Example 40 can optionally include the subject matter of any of the preceding examples in which the removable spacers have a U-shape so that removal includes a step of pinching the ends of the U-shape toward each other.

Example 41 can optionally include the subject matter of any of the preceding examples in which the removable spacers are reusable.

Example 42 can optionally include the subject matter of any of the preceding examples in which a stack is formed including alternating battery plates and porous spacers, said stack is then placed in a containment fixture and sealant is applied to the periphery of said stack.

Example 43 can optionally include the subject matter of any of the preceding examples in which three sides are sealed, electrolyte added, and a top cover placed on the battery.

Example 44 can optionally include the subject matter of any of the preceding examples in which the porous spacers have edge liners to prevent absorption of the sealant into the spacers.

Example 45 can optionally include the subject matter of any of the preceding examples in which the edge liner is an adhesive.

Example 46 can optionally include the subject matter of any of the preceding examples in which the adhesive is silicone.

Example 47 can optionally include the subject matter of any of the preceding examples in which the edge liner is formed by melting the edge of the fiberglass spacer.

Example 48 can optionally include the subject matter of any of the preceding examples in which one face of the substrate is inert.

Example 49 can optionally include the subject matter of any of the preceding examples in which the inert face is silicon Example 50 can optionally include the subject matter of any of the preceding examples in which the inert face is coated with carbon.

Example 51 can optionally include the subject matter of any of the preceding examples in which the inert face is a silicide.

Example 52 can optionally include the subject matter of any of the preceding examples in which the active mass on at least one side is applied using electrophoresis.

Example 53 can optionally include the subject matter of any of the preceding examples in which the active mass material includes lead oxide.

Example 54 can optionally include the subject matter of any of the preceding examples in which active mass is baked at a temperature exceeding 100° C. after electrophoretic deposition.

Example 55 can optionally include the subject matter of any of the preceding examples in which an intervening layer is disposed between the electrophoretic active mass deposition and the plate substrate.

Example 56 can optionally include the subject matter of any of the preceding examples in which plate material includes silicon.

Example 57 can optionally include the subject matter of any of the preceding examples, in which an electrode is formed by electrophoretic co-deposition of an active mass material and a sacrificial material, said sacrificial material being dissolved after electrophoretic co-deposition in order to increase the porosity of the active mass layer.

Example 58 can optionally include the subject matter of any of the preceding examples active mass layer in which the active mass is co-deposited with a second material, a function of said second material being to improve a physical property of the active mass layer.

Example 59 can optionally include the subject matter of any of the preceding examples in which the physical property is adhesion.

Example 60 can optionally include the subject matter of any of the preceding examples in which the physical property is integrity of the active mass layer.

Example 61 can optionally include the subject matter of any of the preceding examples including sand blasting the plate surface.

Example 62 can optionally include the subject matter of any of the preceding examples in which a battery uses a plurality of plates, with at least two plate shaving edges being pre-coated.

Example 63 can optionally include the subject matter of any of the preceding examples in which the pre-coating material is epoxy.

Example 64 can optionally include the subject matter of any of the preceding examples in which the pre-coating material is a plastic substantially resistant to sulfuric acid.

Example 65 can optionally include the subject matter of any of the preceding examples in which the sum of the thicknesses of the pre-coating on plate faces approximately equals the plate separation.

Example 66 can optionally include the subject matter of any of the preceding examples in which a stack of plates is sealed after stacking to provide an outer housing for the battery.

Example 67 can optionally include the subject matter of any of the preceding examples in which the sealing material is plastic.

Example 68 can optionally include the subject matter of any of the preceding examples in which the sealing material is epoxy.

Example 69 can optionally include the subject matter of any of the preceding examples in which the active mass consistency is varied with depth through the use of either multiple sequential depositions or varying deposition parameters through the deposition process.

Example 70 can include, or can optionally be combined with any portion or combination of any portions of any one or more of Examples 1-69 to include subject matter that can include means for performing any one or more of the functions of Examples 1-69, or a machine-readable medium including instructions that, when performed by a machine, cause the machine to perform any one or more of the functions of Examples 1-69.

Each of these non-limiting examples can stand on its own, or can be combined in various permutations or combinations with one or more of the some examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to some examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in certain examples, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A conductive bipolar battery plate, comprising:
an electrically conductive silicon wafer;
a first battery electrode located on a first surface of the electrically conductive silicon wafer; and
a second battery electrode located on a surface of the electrically conductive silicon wafer opposite the first surface, the second electrode having a polarity opposite the first battery electrode and including a layer of carbon;
wherein the first surface of the electrically conductive silicon wafer comprises a silicide; and
wherein an active material is disposed on the silicide.

2. The conductive bipolar battery plate of claim 1, comprising a barrier layer between the silicide layer and the active material.

3. The conductive bipolar battery plate of claim 2, wherein the barrier layer includes one or more of TiN, TaN, molybdenum selenide, tin, or chrome.

4. The conductive bipolar battery plate of claim 1, wherein the active material is porous.

5. The conductive bipolar battery plate of claim 1, wherein the active material includes lead.

6. The conductive bipolar battery plate of claim 1, wherein the conductive silicon wafer includes a roughened or cut surface.

7. The conductive bipolar battery plate of claim 1, wherein the silicide layer includes nickel.

8. The conductive bipolar battery plate of claim 1, wherein the silicide layer includes one or more of tungsten, titanium, or molybdenum.

9. The conductive bipolar battery plate of claim 1, wherein the silicon wafer comprises a metallurgical grade silicon wafer.

10. The conductive bipolar battery plate of claim 1, wherein the silicon wafer comprises a multi-crystalline silicon wafer.

11. The conductive bipolar battery plate of claim 1, wherein the first surface and a second surface of the silicon wafer include a silicide; and
wherein the carbon is disposed on the silicide of the second surface.

12. A bipolar battery assembly, comprising:
at least one conductive bipolar battery plate comprising:
an electrically conductive silicon wafer;
a first battery electrode located on a first surface of the electrically conductive silicon wafer, the first surface comprising a silicide, and an active material disposed on the silicide; and
a second battery electrode located on a second surface of the electrically conductive silicon wafer opposite the first surface, the second electrode having a polarity opposite the first battery electrode and including a layer of carbon; and
a housing configured to support the at least one conductive bipolar battery plate and to fluidically isolate adjacent electrolyte regions from each other, the electrolyte regions located on opposite surfaces of the at least one conductive bipolar battery plate.

13. The bipolar battery assembly of claim 12, comprising a barrier layer between the silicide layer and the active material.

14. The bipolar battery assembly of claim 13, wherein the barrier layer includes one or more of TiN, TaN, molybdenum selenide, tin, or chrome.

15. The bipolar battery assembly of claim 12, wherein the active material is porous.

16. The bipolar battery assembly of claim 12, wherein the active material includes lead.

17. The bipolar battery assembly of claim 12, wherein the conductive silicon wafer includes a roughened or cut surface.

18. The bipolar battery assembly of claim 12, wherein the silicide layer includes one or more of tungsten, titanium, molybdenum, or nickel.

19. The bipolar battery assembly of claim 12, wherein the first surface and a second surface of the silicon wafer include a silicide; and
wherein the carbon is disposed on the silicide of the second surface.

* * * * *